United States Patent [19]

Date et al.

[11] Patent Number: 5,324,781

[45] Date of Patent: Jun. 28, 1994

[54] METHACRYLATE RESIN COMPOSITION

[75] Inventors: Shinji Date; Teruhisa Koyama, both of Chiba; Kanki Matsumoto, Niihama, all of Japan

[73] Assignee: Sumitomo Chemical Co., Ltd., Osaka, Japan

[21] Appl. No.: 65,894

[22] Filed: May 25, 1993

[30] Foreign Application Priority Data

May 25, 1992 [JP] Japan .................................. 4-132212
Nov. 19, 1992 [JP] Japan .................................. 4-310246

[51] Int. Cl.$^5$ ...................... C08L 51/00; C08L 33/12
[52] U.S. Cl. ......................................... 525/80; 525/83; 525/85; 525/222; 525/228; 525/242; 525/309; 525/902; 525/71
[58] Field of Search ................... 525/242, 902, 70, 71, 525/72, 77, 78, 79, 85, 80, 227, 228

[56] References Cited

U.S. PATENT DOCUMENTS 4,897,449  1/1990  Gaillard et al. ........................ 525/85
5,063,259 11/1991  Wanat et al. .......................... 525/85

FOREIGN PATENT DOCUMENTS 53-007792  1/1978  Japan .
54-099190  8/1979  Japan .
59-010745  3/1984  Japan .
61-060749  3/1986  Japan .

*Primary Examiner*—James J. Seidleck
*Assistant Examiner*—Mark L. Marzel
*Attorney, Agent, or Firm*—Birch, Stewart, Kolasch & Birch

[57] ABSTRACT

A methacrylate resin composition containing 20 to 99% by weight of a methacrylate resin and 80 to 1% by weight of a methacrylic two-layer polymer which has an inner layer and an outer layer and is characterized by the properties: (a) the inner layer having repeating units derived from methyl methacrylate and having a viscosity average molecular weight of 500,000 to 5,000,000, (b) the outer layer of the two-layer polymer having repeating units derived from methyl methacrylate and having a viscosity average molecular weight of 50,000 to 300,000, (c) a weight ratio of the inner layer to the outer layer of 1:9 to 9:1, (d) a glass transition temperature of 50° to 120° C. and (e) an average particle size of 200 to 5000 Å, which composition is excellent in moldability, resistance to heat distortion, mechanical properties and also solvent resistance.

6 Claims, No Drawings

METHACRYLATE RESIN COMPOSITION

BACKGROUND OF THE INVENTION

Field of the Invention

The present invention relates to a methacrylate resin composition. More particularly, the present invention relates to a methacrylate resin composition which is excellent in moldability, resistance to heat distortion, mechanical properties and solvent resistance.

Description of the Related Art

Methacrylate resins are widely used in various fields such as automobile parts, electrical components, industrial parts, sundry goods, and the like because of their excellent properties such as transparency, mechanical properties and moldability. But, when an article made of the methacrylate resin is contacted to an organic solvent such as an alcohol (e.g. methanol, ethanol, etc.) or a paint thinner, it is crazed or cracked so that its good appearance, which is one of its inherent characteristics, is deteriorated and further its mechanical properties are decreased.

Hitherto, to improve solvent resistance of the methacrylate resin, Japanese Patent Kokai Publication Nos. 7792/1978 and 99190/1979 propose a solvent resistant methacrylate resin which is prepared by copolymerizing methyl methacrylate and a higher alkyl ester of (meth)acrylic acid.

Japanese Patent Publication No. 10745/1984 discloses a solvent resistant methacrylate resin composition comprising acrylic rubber particles with a particle size of 200 to 900 Å dispersed in the methacrylate resin, each of which particles has a three-layer structure consisting of a first layer of a polymer which comprises methyl methacrylate and a polyfunctional grafting monomer, a second layer of a polymer which comprises an alkyl acrylate and a polyfunctional crosslinking agent and a third layer of a polymer which comprises at least 80% by weight of a methacrylate.

Japanese Patent Kokai Publication No. 60749/1986 discloses a solvent resistant methacrylate resin containing a rubber which comprises a copolymer of an alkyl acrylate and butadiene dispersed therein.

In the case of the copolymer of methyl methacrylate and the higher alkyl (meth)acrylate, the solvent resistance is not satisfactorily improved. The methacrylate resin composition comprising the rubber component dispersed therein has improved impact strength and solvent resistance, but a degree of improvement is not sufficient.

SUMMARY OF THE INVENTION

An object of the present invention is to provide a methacrylate resin composition which has improved solvent resistance with maintaining the inherent properties of the methacrylate resin such as moldability, resistance to heat distortion, mechanical properties.

According to the present invention, there is provided a methacrylate resin composition comprising:
20 to 99% by weight of a methacrylate resin and
80 to 1% by weight of a methacrylic two-layer polymer which comprises an inner layer and an outer layer and is characterized by the following properties (a) to (e):
(a) said inner layer comprising repeating units derived from methyl methacrylate and having a viscosity average molecular weight of 500,000 to 5,000,000,
(b) said outer layer of said two-layer polymer comprising repeating units derived from methyl methacrylate and having a viscosity average molecular weight of 50,000 to 300,000,
(c) a weight ratio of said inner layer to said outer layer of 1:9 to 9:1,
(d) a glass transition temperature of 50° to 120° C. and
(e) an average particle size of 200 to 5000 Å.

DETAILED DESCRIPTION OF THE INVENTION

The methacrylate resin used according to the present invention is a polymer of methyl methacrylate resin. The methacrylate resin can be a rigid methacrylate resin of at least 70% by weight of methyl methacrylate with at least one other ethylenically unsaturated monomer copolymerizable with methyl methacrylate, or a rubber-modified methacrylate resin comprising the rigid methacrylate resin and an acrylic rubber or a butadiene rubber dispersed therein.

Examples of the copolymerizable ethylenically unsaturated monomer are $C_1$–$C_8$-alkyl acrylates, aromatic vinyl monomers such as styrene, acrylonitrile, $C_2$–$C_8$-alkyl methacrylates, and the like.

The rigid methacrylate resin may be prepared by a conventional method such as emulsion polymerization, suspension polymerization and bulk polymerization, in batchwise or continuously.

As the acrylic rubber to be used for modifying the methacrylate resin, there are known various kinds of rubbers. Examples of the acrylic rubber are a crosslinked elastomer prepared by copolymerizing an alkyl acrylate, styrene or a styrene derivative and a polyfunctional monomer having at least two carbon-carbon double bonds in a molecule, a graft polymer prepared by grafting a monomer comprising methyl methacrylate to said crosslinked elastomer, and a polymer prepared by stepwise polymerization of a layer comprising an alkyl acrylate, styrene or a styrene derivative and the above polyfunctional monomer and another layer from methyl methacrylate, such as those disclosed in Japanese Patent Publication Nos. 27576/1980 and 36645/1984 and Japanese Patent Kokai Publication No. 94917/1980.

Examples of the butadiene rubber to be used for modifying the methacrylate resin are a graft polymer comprising polybutadiene to which methyl methacrylate, an alkyl acrylate or styrene is grafted, and a polymer prepared by multi-stage polymerizing a layer from a monomer comprising butadiene and a layer from a monomer comprising methyl methacrylate.

A content of the rubber component to be contained in the rubber-modified methacrylate resin is from 3 to 60% by weight, preferably from 5 to 50% by weight based on the weight of the whole rubber-modified resin. When the content of the rubber component is less than 3% by weight, the resin composition has insufficient impact strength. When this content exceeds 60% by weight, the hot resistance or the mechanical properties such as stiffness of the resin composition are deteriorated unpreferably.

The rubber-modified methacrylate resin may be prepared by melt mixing the rubber component in the methacrylate resin or by polymerizing the monomer mixture comprising at least 70% by weight of methyl methacrylate in the presence of the rubber component.

The two-layer polymer of the present invention consists of the inner layer which forms a core and the outer layer which forms a shell.

The inner layer is prepared by polymerizing a monomer comprising methyl methacrylate, and has a viscosity average molecular weight of 500,000 to 5,000,000, preferably 2,000,000 to 5,000,000. When the viscosity average molecular weight is lower than 500,000, the solvent resistance is not sufficiently improved. As the viscosity average molecular weight increases, the solvent resistance is further improved. But, when the viscosity average molecular weight exceeds 5,000,000, a polymerization rate decreases.

When the inner layer has a crosslinked structure, the solvent resistance may be deteriorated.

The monomer comprising methyl methacrylate intends mean a monomer containing at least about 60% by weight of methyl methacrylate and the rest of the above described other copolymerizable ethylenically unsaturated monomer.

The outer layer of the two-layer polymer of the present invention is formed by a polymer of a monomer comprising methyl methacrylate. The viscosity average molecular weight of the outer layer is from 50,000 to 300,000, preferably from 70,000 to 200,000. When the viscosity average molecular weight is lower than 50,000, the solvent resistance is not sufficiently improved. When the viscosity average molecular weight exceeds 300,000, flowability of the resin composition decreases so that the moldability becomes insufficient.

The outer layer may be a single layer or have two or more sublayers. Preferably, an outer sublayer has a smaller molecular weight than an inner sublayer.

The outer layer increases compatibility of the two-layer polymer with the rigid methacrylate resin and prevents the generation of craze caused by stress or the deterioration of the mechanical properties of the methacrylate resin composition.

The weight ratio of the inner layer to the outer layer of 1:9 to 9:1, preferably from 5:5 to 9:1. When a ratio of the inner layer is too small, the solvent resistance of the resin composition is insufficient and further the flowability of the resin composition decreases so that the moldability of the resin composition is deteriorated. When a ratio of the outer layer is too small, the craze tends to appear on the resin composition or the mechanical properties of the resin composition tend to decrease.

Preferably the two-layer polymer has a higher glass transition temperature for the purpose of maintaining the mechanical properties and heat resistance of the methacrylate resin composition. The glass transition temperature is at least 50° C., preferably at least 80° C. The upper limit is about 120° C which the maximum glass transition temperature of the methacrylate resin.

Since the glass transition temperature increases as the content of methyl methacrylate units increases, it can be adjusted in the above range by selecting the kind and amount of the other copolymerizable ethylenically unsaturated monomer.

The two-layer polymer has an average particle size of 200 to 5000 Å, preferably 1000 to 4500 Å. When the average particle size is smaller than 200 Å, the resin composition has extremely low flowability. When it exceeds 5000 Å, a surface of molded article of the methacrylate resin composition is roughened.

The two-layer polymer to be used in the present invention can be easily prepared by successive double-stage polymerization. That is, the inner layer forming the core is first formed by emulsion polymerization and then the outer layer is formed by emulsion polymerization in the presence of the inner layer polymer particles.

A polymerization temperature is usually from 30° to 120° C. A polymerization time depends on kinds and amounts of a polymerization initiator and an emulsifier, and is usually from 0.5 to 7.0 hours for the formation of the inner layer.

A ratio of the monomer(s) to water is from about 1:20 to about 1:1.

To adjust the viscosity average molecular weights of the inner and outer layers, it may be possible to use a conventional polymerization degree regulator (chain transfer agent) such as mercaptan and the like.

The emulsifier may be any of conventionally used ones. Examples of the emulsifier are long chain alkyl carboxylate salts, alkyl sulfosuccinate salts, alkyl benzene-sulfonate salts, and the like.

The particle size of the two-layer polymer can be controlled by a known technique in the emulsion polymerization, for example, control of emulsifying conditions such as a concentration of the emulsifier. However, an excessive amount of the emulsifier will interfere the formation of the two layer structure of the polymer.

The particle size can be measured in a latex form after the polymerization by any of known methods such as observation with a microscope, a light absorbance method, a static light scattering method, a dynamic light scattering method, a centrifugal sedimentation method, and the like.

The polymerization initiator may be any of conventionally used ones. Examples of the polymerization initiator are inorganic polymerization initiators (e.g. persulfates, pernitrates, etc.); redox initiators comprising such inorganic polymerization initiators and reducing agents such as a sulfite salt; redox initiators such as an organic hydroperoxide/ferrous salt or an organic hydroperoxide/sodium formaldehyde sulfoxylate; benzoyl peroxide; azobisisobutyronitrile; and the like.

The methacrylate resin composition of the present invention may be obtained by mixing 20 to 99% by weight, preferably 50 to 95% by weight of the methacrylate resin and 1 to 80% by weight, preferably 5 to 50% by weight of the two-layer polymer. When the amount of the two-layer polymer is less than 1% by weight, the solvent resistance of the resin composition is only slightly improved. When the amount of the two-layer polymer exceeds 80% by weight, the flowability of the resin composition decreases so that the moldability of the resin composition is deteriorated.

The methacrylate resin and the two-layer polymer can be mixed by any of conventional methods for mixing resins, insofar as they are homogeneously mixed.

For example, pellets or powder of the rigid methacrylate resin or the rubber-modified and the two-layer polymer; or pellets or powder of the rigid methacrylate resin, the rubber component and the two-layer polymer are mixed in a twin-shell blender or a Henschel mixer and then the mixture is melt mixed with mixing rolls or a screw extruder at a temperature of 150° to 300° C.

In this case, it is possible to add a stabilizer, a lubricant, a plasticizer, a dye or pigment, a filler and the like.

Further, the two-layer polymer is dispersed in the monomer or monomers constituting the rigid methacrylate resin or a syrup of the monomer or monomers and then the monomer or monomers are bulk or suspension polymerized to obtain the methacrylate resin composition of the present invention.

Alternatively, in the preparation step of the rubber-modified methacrylate resin, a latex of the two-layer polymer is blended in a latex of the rubber component which has been prepared by the emulsion polymerization, and then the resin components are separated from the blended latex and melt mixed with the rigid methacrylate resin, or the above two latexes are blended with a latex of the rigid methacrylate resin, and the resin components are separated from the blended latex.

The methacrylate resin composition of the present invention can improve the solvent resistance with maintaining the moldability, resistance to heat distortion and mechanical property of the rigid or rubber-modified methacrylate resin. In comparison with a conventional multilayer polymer composition comprising an acrylic rubber component, the methacrylate resin composition of the present invention has much improved solvent resistance.

PREFERRED EMBODIMENTS OF THE INVENTION

The present invention will be explained further in detail by the following Examples.

The abbreviations used in Examples have the following significances:
MMA: Methyl methacrylate
EA: Ethyl acrylate
BA: n-Butyl acrylate
AMA: Allyl methacrylate
ST: Styrene
CHP: Cumene hydroperoxide
NaDDBS: Sodium dodecylbenzenesulfonate In Examples, the properties are measured as follows:

Viscosity Average Molecular Weight

A viscosity average molecular weight is calculated from a viscosity of a solution of the polymer measured according JIS Z8803 using the following equation:

$$\eta_{sp/c} = [\eta](1 + 0.4[\eta] \times C)$$

$$[\eta] = 4.8 \times 10^{-5} (Mv)^{0.8}$$

wherein $\eta_{sp/c}$ is a specific viscosity (dl/g), $[\eta]$ is an intrinsic viscosity, C is a concentration of the solution (g/dl), and Mv is a viscosity average molecular weight of the polymer.

Solvent Resistance

The solvent resistance is measured by supporting an injection molded dumbbell form specimen (126.5 mm×12.7 mm×3.3 mm) in a cantilever beam style, applying a load on a position which is 66 mm apart from a support point so that a stress of 150 kg/cm$^2$ is generated on a surface of the specimen on the support point, coating isopropanol on the specimen surface on the support point and measuring a time period (seconds) till crazes appear on the specimen surface. The measurements are repeated three times and the time periods are averaged.

Melt Index (MI)

A melt index (g/10 minutes) is measured according to ASTM D1238 at 230° C. under a load of 3.8 for a period of 10 minutes.

Tensile Strength

A tensile strength (Kg/cm$^2$) is measured according to ASTM D638.

Impact Strength

An Izod notched impact strength (kg.cm/cm) is measured according to ASTM D256 at 23° C.

Heat Resistance and Heat Distortion Temperature

Heat resistance and heat distortion temperature (HDT) (° C.) are measured according to ASTM D648.

Particle Size

A particle size is measured by micro-particle size analyzer (Type BI-90S manufactured by Nikkiso Co., Ltd.).

Glass Transition Temperature

A glass transition temperature is measured by a differential scanning calorimeter (DS-10 manufactured by Seiko Denshi Kogyo Co., Ltd.).

As processing machines, a vented 30 mm screw extruder (manufactured by Tanabe Plastics Machinery Co., Ltd.) and an injection molding machine (M-140 manufactured by Meiki Seisakusho Co., Ltd.) are used.

EXAMPLE 1

(a) Preparation of a Two-Layer Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (366 g) containing 0.1% of CHP and EA (15 g) were charged. Thereafter, the mixture was heated up to 70° C. while stirring and further stirred for 45 minutes. To the mixture, a mixture of MMA (1080 g) containing 0.1% of CHP and EA (45 g) was added over a period of 100 minutes. After the addition, the mixture was further stirred for 60 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 1,900,000.

To the polymer latex obtained in the previous step, MMA (360 g) containing 0.1% of CHP and 0.4% of laurylmercaptan and EA (15 g) were added over a period of 60 minutes. After the addition, the mixture was stirred for further 60 minutes to complete the polymerization of an outer layer.

The particle size of the two-layer polymer was measured and found to be 1500 Å.

The obtained latex was poured in a 0.5% aqueous solution of aluminum chloride to coagulate the polymer. The coagulated polymer was washed with warm water five times and dried to obtain the layer-structure polymer, which had the glass transition temperature of 104° C.

The same monomer mixture as used for forming the outer layer were polymerized under the same conditions in the absence of the inner layer resin. The obtained polymer had the viscosity average molecular weight of 110,000.

(b) Preparation of a Methacrylate Resin Composition

Rigid methacrylate resin particles which were produced by a conventional suspension polymerization, consisted of 96% by weight of methyl methacrylate repeating units and 4% by weight of ethyl acrylate units and had an average molecular weight of 120,000 and the the two-layer polymer prepared in the above step (a) were mixed in a weight ratio shown in Table 1 using a Henschel mixer and melt mixed in the vented screw extruder at a cylinder temperature of 220° to 270° C. to obtain pellets.

The pellets were dried at 80° C. for 5 hours and injection molded by the injection molding machine at 240° C. to form a dumbbell form specimen, and its properties were measured and evaluated. The results are shown in Table 1.

EXAMPLES 2 AND 3

In the same manner as in the preparation of a methacrylate resin composition (b) of Example 1 except that the rigid methacrylate resin and the two-layer polymer were used in the ratio shown in Table 1, the methacrylate resin composition was prepared.

The results are shown in Table 1.

COMPARATIVE EXAMPLE 1

Only the rigid methacrylate resin particles used in the step (b) of Example 1 were subjected to the property evaluation. The results are shown in Table 1.

EXAMPLE 4

(a) Preparation of a Two-Layer Polymer

In a 5 liter glass reactor equipped with a condenser, ion-exchanged water (1740 g) and sodium formaldehyde sulfoxylate (Rongalite) (0.6 g) were charged and stirred in a nitrogen stream and then MMA (102 g) containing 0.1% of CHP, EA (4 g) and NaDDBS (0.5 g) were charged. Thereafter, the mixture was heated up to 70° C. while stirring and further stirred for 80 minutes. To the mixture, a mixture of MMA (1344 g) containing 0.1% of CHP, EA (56 g) and NaDDBS (6 g) was added over a period of 150 minutes. After the addition, the mixture was further stirred for 90 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 1,700,000.

To the polymer latex obtained in the previous step, MMA (360 g) containing 0.1% of CHP and 0.4% of laurylmercaptan and EA (15 g) were added over a period of 60 minutes. After the addition, the mixture was stirred for further 60 minutes to complete the polymerization of an outer layer.

The particle size of the two-layer polymer was measured and found to be 3950 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 104° C.

The same monomer mixture as used for forming the outer layer were polymerized under the same conditions in the absence of the inner layer resin. The obtained polymer had the viscosity average molecular weight of 110,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 5

(a) Preparation of a Two-Layer Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (366 g) containing 0.1% of CHP and EA (15 g) were charged. Thereafter, the mixture was heated up to 70° C. while stirring and further stirred for 45 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 1,500,000.

To the polymer latex obtained in the previous step, MMA (1440 g) containing 0.1% of CHP and 0.4% of laurylmercaptan and EA (60 g) were added over a period of 180 minutes. After the addition, the mixture was stirred for further 60 minutes to complete the polymerization of an outer layer.

The particle size of the two-layer polymer was measured and found to be 1600 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 103° C.

The same monomer mixture as used for forming the outer layer were polymerized under the same conditions in the absence of the inner layer resin. The obtained polymer had the viscosity average molecular weight of 110,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 6

(a) Preparation of a Two-Layer Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (366 g) containing 0.1% of CHP and 0.02% of laurylmercaptan and EA (15 g) were charged. Thereafter, the mixture was heated up to 70° C. while stirring and further stirred for 45 minutes. To the mixture, a mixture of MMA (1080 g) containing 0.1% of CHP and 0.02% of laurylmercaptan and EA (45 g) was added over a period of 100 minutes. After the addition, the mixture was further stirred for 100 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 830,000.

To the polymer latex obtained in the previous step, MMA (360 g) containing 0.1% of CHP and 0.4% of laurylmercaptan and EA (15 g) were added over a period of 60 minutes. After the addition, the mixture was stirred for further 60 minutes to complete the polymerization of an outer layer.

The particle size of the two-layer polymer was measured and found to be 1500 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 102° C.

The same monomer mixture as used for forming the outer layer were polymerized under the same conditions in the absence of the inner layer resin. The obtained polymer had the viscosity average molecular weight of 110,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 7

(a) Preparation of a Two-Layer Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (366 g) containing 0.1% of CHP and EA (15 g) were charged. Thereafter, the mixture was heated up to 70° C. while stirring and further stirred for 45 minutes. To the mixture, a mixture of MMA (1080 g) containing 0.1% of CHP and EA (45 g) was added over a period of 100 minutes. After the addition, the mixture was further stirred for 60 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 1,900,000.

To the polymer latex obtained in the previous step, MMA (360 g) containing 0.1% of CHP and 0.2% of laurylmercaptan and EA (15 g) were added over a period of 60 minutes. After the addition, the mixture was stirred for further 60 minutes to complete the polymerization of an outer layer.

The particle size of the two-layer polymer was measured and found to be 1500 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 104° C.

The same monomer mixture as used for forming the outer layer were polymerized under the same conditions in the absence of the inner layer resin. The obtained polymer had the viscosity average molecular weight of 180,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 8

(a) Preparation of a Two-Layer Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (366 g) containing 0.1% of CHP and EA (15 g) were charged. Thereafter, the mixture was heated up to 70° C. while stirring and further stirred for 45 minutes. To the mixture, a mixture of MMA (1080 g) containing 0.1% of CHP and EA (45 g) was added over a period of 100 minutes. After the addition, the mixture was further stirred for 60 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 1,900,000.

To the polymer latex obtained in the previous step, MMA (360 g) containing 0.1% of CHP and 0.6% of laurylmercaptan and EA (15 g) were added over a period of 60 minutes. After the addition, the mixture was stirred for further 60 minutes to complete the polymerization of an outer layer.

The particle size of the two-layer polymer was measured and found to be 1500 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 103° C.

The same monomer mixture as used for forming the outer layer were polymerized under the same conditions in the absence of the inner layer resin. The obtained polymer had the viscosity average molecular weight of 80,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 9

(a) Preparation of a Two-Layer Polymer

In a 5 liter glass reactor equipped with a condenser, ion-exchanged water (1740 g) and NaDDBS (30 g) were charged and stirred in a nitrogen stream and then MMA (1446 g) and EA (60 g) were charged, followed by the addition of ion-exchanged water (100 g) containing 0.046% of sodium persulfate over a period of 60 minutes. After the addition, the mixture was further stirred for 60 minutes to complete the polymerization of an inner layer.

A small amount of a polymer latex was sampled and water was evaporated off to recover the dried resin. Then, a viscosity of a solution of the resin was measured and a viscosity average molecular weight of the inner layer resin was calculated. The inner layer resin had the viscosity average molecular weight of 4,000,000.

To the polymer latex obtained in the previous step, a mixture of MMA (360 g) containing 0.4% of laurylmercaptan and EA (15 g) and ion-exchanged water (30 g) containing 1.3% of sodium persulfate were added over a period of 30 minutes. After the addition, the mixture was stirred for further 30 minutes to complete the polymerization of an outer layer.

The particle size of the two-layer polymer was measured and found to be 1500 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 104° C.

The same monomer mixture as used for forming the outer layer were polymerized under the same conditions in the absence of the inner layer resin. The obtained polymer had the viscosity average molecular weight of 110,000.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 10

(a) Preparation of a Two-Layer Polymer

In the same manner as in Example 9 except that a concentration of sodium persulfate was changed to 0,075% in the polymerization of the inner layer resin, a two-layer polymer was prepared.

The inner layer resin had the viscosity average molecular weight of 3,500,000, and the two-layer polymer had the particle size of 1,900 Å and the glass transition temperature of 104° C.

(b) Preparation of a Methacrylate Resin Composition

In the same manner as in Example 3 except that the two-layer polymer obtained in the step (a) of this Example was used, a methacrylate resin composition was prepared. The results are shown in Table 1.

EXAMPLE 11

(a) Preparation of an Acrylic Rubber

A three layer-structure acrylic rubber was prepared in accordance with the method disclosed in Examples of Japanese Patent Publication No. 57576/1980.

That is, in a 5 liter glass reactor, ion-exchanged water (1700 g), sodium carbonate (0.7 g) and sodium persulfate (0.3 g) were charged and stirred in a nitrogen stream and then a surfactant (PELEX OT-P manufactured by KAO) (4.46 g), ion-exchanged water (150 g), MMA (510 g) and AMA (0.3 g) were charged. Thereafter, the mixture was heated up to 75° C. and stirred for 150 minutes. To the mixture, a mixture of BA (689 g), ST (162 g) and AMA (17 g) and another mixture of sodium persulfate (0.85 g), PELEX OT-P (7.4 g) and ion-exchanged water (50 g) were separately added over a period of 90 minutes, followed by polymerization for 90 minutes. After the completion of polymerization, a mixture of MMA (326 g) and EA (14 g) and ion-exchanged water (30 g) containing sodium persulfate (0.34 g) were separately added over a period of 30 minutes. Then, the mixture was further stirred for 60 minutes to complete the polymerization. The particle size of the polymer was 3800 Å.

The obtained latex was poured in a 0.5% aqueous solution of aluminum chloride to coagulate the polymer. The coagulated polymer was washed with warm water five times and dried to obtain the the acrylic rubber.

(b) Preparation of a Rubber-Modified Methacrylate Resin

The same rigid methacrylate resin particles as used in the step (b) of Example 1 and the acrylic rubber prepared in the step (a) of this Example were mixed in a weight ratio of 60:30 by a Henschel mixer and melt mixed and pelletized by the vented screw extruder at a cylinder temperature of 220° to 270° C.

(c) Preparation of a Methacrylate Resin Composition

The rubber-modified methacrylate resin prepared in the previous step (b) (90 parts by weight) and the the two-layer polymer prepared in the step (a) of Example 1 (10 parts by weight) were mixed using a Henschel mixer and melt mixed and pelletized in the vented screw extruder at a cylinder temperature of 220° to 270° C.

The pellets were dried at 80° C. for 5 hours and injection molded by the injection molding machine at 240° C. to form a dumbbell form specimen, and its properties were measured and evaluated. The results are shown in Table 2.

EXAMPLES 12–14

In the same manner as in the step (c) of Example 11 except that the two-layer polymer prepared in the step (a) of Example 1, the rigid methacrylate resin particles prepared in the step (b) of Example 1 and the acrylic rubber prepared in the step (a) of Example 11 were used in the ratio shown in Table 2, the methacrylate resin composition was prepared. The results are shown in Table 2.

EXAMPLE 15

In the same manner as in the step (c) of Example 11 except that the two-layer polymer prepared in the step (a) of Example 9, the rigid methacrylate resin particles prepared in the step (b) of Example 1 and the acrylic rubber prepared in the step (a) of Example 11 were used in the ratio shown in Table 2, the methacrylate resin composition was prepared. The results are shown in Table 2.

EXAMPLE 16

In the same manner as in the step (c) of Example 11 except that the two-layer polymer prepared in the step (a) of Example 10, the rigid methacrylate resin particles prepared in the step (b) of Example 1 and the acrylic rubber prepared in the step (a) of Example 11 were used in the ratio shown in Table 2, the methacrylate resin composition was prepared. The results are shown in Table 2.

COMPARATIVE EXAMPLE 2

In the same manner as in Example 11 except that the ratio of the rigid methacrylate resin particles to the acrylic rubber was changed to 80:20 in the step (b) of Example 11, a methacrylate resin composition containing no two-layer polymer was prepared. The results are shown in Table 2.

COMPARATIVE EXAMPLE 3

(a) Preparation of a Crosslinked Two Layer-Structure Polymer

In a 5 liter glass reactor equipped with a condenser, ion-exchanged water (1740 g), NaDDBS (30 g) and sodium formaldehyde sulfoxylate (Rongalite) (0.6 g) were charged and stirred in a nitrogen stream and then MMA (358 g) containing 0.1% of CHP, EA (15 g) and AMA (8 g) were charged. Thereafter, the mixture was heated up to 70° C. while stirring and further stirred for 45 minutes to complete the polymerization of an inner layer.

To the polymer latex obtained in the previous step, a mixture of MMA (1440 g) containing 0.1% of CHP and EA (55 g) was added over a period of 80 minutes. After the addition, the mixture was kept standing for 60 minutes to complete the polymerization of an outer layer. The particle size of the polymer was measured and found to be 1380 Å.

The obtained latex was poured in a 0.5% aqueous solution of aluminum chloride to coagulate the polymer. The coagulated polymer was washed with warm water five times and dried to obtain the the layer-structure polymer, which had the glass transition temperature of 104° C. had the viscosity average molecular weight of 110,000.

(b) Preparation of a Methacrylate Resin Composition

In the same manner as in Example 2 except that the two-layer polymer obtained in the step (a) of this Comparative Example was used, a methacrylate resin composition was prepared. The results are shown in Table 2.

COMPARATIVE EXAMPLE 4

In the same manner as in the step (c) of Example 9 except that the two-layer polymer prepared in the step (a) of Comparative Example 3 was used, the methacrylate resin composition was prepared. The results are shown in Table 2.

TABLE 1

| Example No. | Rigid methacrylate resin (%) | Two layer-structure polymer (%) | Solvent resistance (sec.) | MI | Tensile strength | HDT (°C.) |
|---|---|---|---|---|---|---|
| 1 | 80 | 20 | 25 | 1.4 | 670 | 94 |
| 2 | 70 | 30 | 83 | 0.4 | 690 | 95 |
| 3 | 60 | 40 | 394 | 0.2 | 720 | 102 |
| 4 | 60 | 40 | 130 | 0.1 | 700 | 102 |
| 5 | 60 | 40 | 31 | 0.7 | 680 | 101 |
| 6 | 60 | 40 | 42 | 0.1 | 720 | 99 |
| 7 | 60 | 40 | 130 | 0.1 | 690 | 100 |
| 8 | 60 | 40 | 215 | 0.1 | 700 | 100 |
| 9 | 60 | 40 | 48 | 0.1 | 740 | 99 |
| 10 | 60 | 40 | 35 | 0.1 | 730 | 99 |
| C. 1 | 100 | 0 | 6 | 2.0 | 730 | 103 |

TABLE 2

| Example No. | Rigid methacrylate resin (%) | Acrylic rubber (%) | Two layer-structure polymer (%) | Solvent resistance (sec.) | MI | Tensile strength | Impact strength | HDT (°C.) |
|---|---|---|---|---|---|---|---|---|
| 11 | 60 | 30 | 10 | 24 | 0.2 | 480 | 5 | 91 |
| 12 | 60 | 20 | 20 | 55 | 0.1 | 550 | 4 | 93 |
| 13 | 60 | 10 | 30 | 77 | 0.1 | 630 | 3 | 93 |
| 14 | 80 | 10 | 10 | 21 | 0.6 | 620 | 3 | 93 |
| 15 | 60 | 20 | 20 | 30 | 0.1 | 580 | 4 | 98 |
| 16 | 60 | 20 | 20 | 32 | 0.1 | 570 | 4 | 98 |
| C. 2 | 80 | 20 | 0 | 11 | 1.0 | 550 | 4 | 93 |
| C. 3 | 70 | 0 | 30 | 33 | 0.1 | 710 | 2 | 100 |
| C. 4 | 60 | 30 | 10 | 13 | 0.4 | 470 | 5 | 92 |

What is claimed is:

1. A methacrylate resin composition comprising: 20 to 99% by weight of a methacrylate resin and 80 to 1% by weight of a methacrylic two-layer polymer which consists essentially of an inner layer and an outer layer and is characterized by the following properties (a) to (e):
(a) said inner layer comprising repeating units derived from methyl methacrylate and having a viscosity average molecular weight of 500,000 to 5,000,000,
(b) said outer layer of said two-layer polymer comprising repeating units derived from methyl methacrylate and having a viscosity average molecular weight of 50,000 to 300,000,
(c) a weight ratio of said inner layer to said outer layer of 1:9 to 9:1,
(d) a glass transition temperature of 50° to 120° C. and
(e) an average particle size of 200 to 5000 Å.

2. The methacrylate resin composition according to claim 1, wherein said methacrylate resin comprises at least 70% by weight of methyl methacrylate and at least one other ethylenically unsaturated monomer copolymerizable with methyl methacrylate.

3. The methacrylate resin composition according to claim 1, wherein said methacrylate resin is a rubber-modified methacrylate resin containing at least one rubber component selected from the group consisting of an acrylic rubber and a butadiene rubber.

4. The methacrylate resin composition according to claim 1, which comprises 50 to 95% by weight of said methacrylate resin and 50 to 5% by weight of said two-layer polymer.

5. The methacrylate resin composition according to claim 1, wherein said two-layer polymer is characterized by the following properties (a) to (e):
(a) said inner layer comprising repeating units derived from methyl methacrylate and having a viscosity average molecular weight of 2,000,000 to 5,000,000, (b) said outer layer of said two-layer polymer comprising repeating units derived from methyl methacrylate and having a viscosity average molecular weight of 70,000 to 200,000, (c) a weight ratio of said inner layer to said outer layer of 5:5 to 9:1, (d) a glass transition temperature of 80° to 120° C. and (e) an average particle size of 1000 to 4500 Å.

6. The methacrylate resin composition according to claim 1, wherein the viscosity average molecular weight of the methacrylate resin is the same as or similar to the viscosity average molecular weight of the methylmethacrylate present in said outer layer of the two-layer polymer.

* * * * *